United States Patent [19]

Braun

[11] Patent Number: 4,597,485
[45] Date of Patent: Jul. 1, 1986

[54] FRICTION CLUTCH

[75] Inventor: Helmut Braun, Baden-Baden, Fed. Rep. of Germany

[73] Assignee: Luk Lamellen und Kupplungsbau GmbH, Bühl, Fed. Rep. of Germany

[21] Appl. No.: 637,901

[22] Filed: Aug. 6, 1984

[30] Foreign Application Priority Data

Aug. 5, 1983 [DE] Fed. Rep. of Germany ....... 3328359
Dec. 16, 1983 [DE] Fed. Rep. of Germany ....... 3347817

[51] Int. Cl.$^4$ .......................... F16D 13/50; B25G 3/02
[52] U.S. Cl. ............................... 192/70.27; 192/89 B; 192/96; 403/348
[58] Field of Search .................... 192/70.27, 89 B, 96; 403/348, 349

[56] References Cited

U.S. PATENT DOCUMENTS

| | | | |
|---|---|---|---|
| 650,272 | 5/1900 | Perry | 403/348 X |
| 1,979,968 | 11/1934 | Geiger et al. | 403/348 X |
| 2,561,279 | 7/1951 | Holt | 403/349 X |
| 2,952,453 | 9/1960 | Haussermann | 192/89 B X |
| 4,125,339 | 11/1978 | Pittinger, Sr. et al. | 403/348 |

FOREIGN PATENT DOCUMENTS

| | | | |
|---|---|---|---|
| 1394118 | 5/1975 | United Kingdom | 192/89 B |
| 508608 | 8/1976 | U.S.S.R. | 192/89 B |

Primary Examiner—Allan D. Herrmann
Attorney, Agent, or Firm—Peter K. Kontler

[57] ABSTRACT

A friction clutch wherein the diaphragm spring has two sets of inwardly extending prongs which are axially spread apart by the marginal portion of an axially movable release plate serving to disengage the clutch by pivoting the diaphragm spring relative to a plate-like carrier on the crankshaft of the engine in a motor vehicle to thereby relax the bias upon a pressure plate which normally presses a clutch disc against a counterpressure plate connected to the carrier. The coupling between the marginal portion of the release plate and one set of the prongs is a bayonet lock type connection which can be disengaged by turning the release plate relative to the diaphragm spring against the opposition of male and female detent members to thereby move each prong of the one set into register with a discrete opening in the marginal portion of the release plate. The release plate stresses the two sets of prongs and is clamped between them when it is turned in a direction to move the prongs of the one set out of register with the corresponding openings. At such time, the prongs of the one set move along sloping ramps which guide them into engagement with convex abutments at one side of the release plate. The other side of the release plate has convex abutments for the prongs of the other set.

24 Claims, 5 Drawing Figures

FRICTION CLUTCH

BACKGROUND OF THE INVENTION

The present invention relates to friction clutches, especially to friction clutches for use in motor vehicles. More particularly, the invention relates to improvements in friction clutches of the type wherein the radially outermost portion of a diaphragm spring reacts against a support, an adjacent portion of the diaphragm spring bears against a pressure plate and the inwardly extending prongs of the diaphragm spring can cooperate with a release member to relax the bias upon the pressure plate by pivoting the diaphragm spring in the region of its radially outermost portion.

It is already known to couple the prongs of the diaphragm spring to the release member and to provide an actuating device which moves the release member axially to thus disengage the clutch against the opposition of the diaphragm spring. In many instances, the coupling between the release member and the prongs of the diaphragm spring constitutes or acts not unlike a bayonet lock, i.e., it is necessary to effect an angular displacement between the diaphragm spring and the release member in order to disengage the latter from the prongs. Reference may be had to German Offenlegungsschrift No. 21 14 661 which discloses a release member with elastic fingers receivable in specially configurated slots between the prongs of the diaphragm spring. The fingers of the release member are thereupon deformed in the axial direction of the diaphragm spring with resort to a special tool and are thereby moved behind the plane of the prongs on the diaphragm spring. In the next step, the release member is rotated so that the deformed fingers engage the rear sides of the adjacent prongs.

A drawback of the just described conventional bayonet lock is that the provision of elastic fingers on the release member, the provision of a special tool for axial deformation of the fingers, and the making of specially designed slots for the fingers between certain prongs of the diaphragm spring contribute significantly to the initial cost of the friction clutch. Furthermore, the assembly of such friction clutches takes up much time and all of the operations which are necessary to couple the release member to the prongs of the diaphragm spring cannot be readily automated.

Another prior bayonet lock type coupling for use in friction clutches is disclosed in British Pat. No. 1,221,761 which proposes the use of a release member with a cylindrical extension having slots for selected prongs of the diaphragm spring. Each slot has a circumferentially extending end portion which receives a prong in response to rotation of the release member relative to the diaphragm spring.

A drawback of the patented friction clutch is that the axial length of the release member is considerable which increases the space requirements of the clutch. This is undesirable in many types of motor vehicles wherein the space which is available for installation of the clutch is often extremely small, as considered in the axial direction of the clutch. Furthermore, the assembly of the release member with the prongs of the diaphragm spring also necessitates the use of a specially designed tool which moves selected prongs of the diaphragm spring in the axial direction in order to align such selected prongs with the end portions of the respective slots prior to turning of the release member with reference to the diaphragm spring.

OBJECTS AND SUMMARY OF THE INVENTION

An object of the invention is to provide a friction clutch, especially for use in motor vehicles, with novel and improved means for coupling the release member to the prongs of the diaphragm spring.

Another object of the invention is to provide a novel and improved bayonet lock type connection between the prongs of the diaphragm spring and the release member in a friction clutch for motor vehicles or the like.

A further object of the invention is to provide a simple, compact and inexpensive release member for use in the above outlined friction clutch.

An additional object of the invention is to provide a novel and improved method of assembling the release member with the prongs of the diaphragm spring without necessitating the utilization of specially designed tools.

Still another object of the invention is to provide a bayonet lock connection which couples the release member to the prongs of the diaphragm spring in a friction clutch and does not exhibit the aforediscussed and many other drawbacks of presently known connections.

Another object of the invention is to provide a friction clutch wherein the connection between the prongs of the diaphragm spring and the release member can be established or terminated in a surprisingly simple, economical and efficient way.

A further object of the invention is to provide a novel and improved coupling which connects the prongs of the diaphragm spring to the release plate of a friction clutch and is more reliable than heretofore known couplings.

Still another object of the invention is to provide a novel and improved diaphragm spring which can be used in a friction clutch of the above outlined character.

Another object of the invention is to provide a friction clutch wherein the release member takes up little room, as considered in the axial direction of the clutch, even though its connection to the diaphragm spring is more reliable than in heretofore known friction clutches.

The invention is embodied in a friction clutch, particularly for use in motor vehicles. The improved clutch comprises a support, an axially movably pressure plate, and a diaphragm spring disposed between the support and the pressure plate and having a first portion which reacts against the support, a second portion which bears against the pressure plate, first prongs which extend inwardly from the first and second portions, and second prongs which alternate with at least some of the first prongs, as considered in the circumferential direction of the spring. The first and second prongs of the diaphragm spring are axially offset relative to each other, and the improved friction clutch further comprises a substantially plate-like axially movable release member having a first side which normally faces the first prongs, a second side which normally faces the second prongs, a marginal portion which is provided with an opening for each second prong, first substantially coplanar abutments provided at the first side and engaging with the first prongs, and second substantially coplanar abutments which are provided at the second side of the release member and each of which engages a discrete second prong. The release member is movable angularly relative to the spring (or vice versa) in order to place the second prongs into register with the respective openings, and the release member is arranged to maintain the first and second prongs in axially stressed condition so that the axial distance between the planes of the first and second prongs when the prongs engage the respective abutments exceeds the axial distance between such planes when the second prongs register with and are free to enter the respective openings.

The support of the friction clutch can include a housing for the pressure plate and for the diaphragm spring. The prongs of the diaphragm spring preferably extend at least substantially radially inwardly of the first and second portions of the diaphragm spring, and the abutments of the release member are preferably engaged by the radially innermost portions of the corresponding prongs on the diaphragm spring.

The number of first prongs can exceed (and can be a multiple of) the number of second prongs.

The friction clutch further comprises actuating means (such as a rod which is reciprocable in the axial direction of the friction clutch) for moving the release member axially in a direction to pivot the diaphragm spring in the region of one of its first and second portions and to thereby relax the bias of the diaphragm spring upon the pressure plate. The first side of the release member faces in, and the second side of the release member faces counter, to the direction in which the actuating means must move the release member in order to pivot the spring.

The distance between the axis of the diaphragm spring and the first abutments preferably at least approximates the distance between such axis and the second abutments. At least some of the abutments preferably have convex surfaces in contact with the respective prongs.

The second side of the release member is preferably further provided with ramps, one for each of the openings and each adjacent to the respective opening. The ramps slope toward the respective second abutments to facilitate angular movement of the corresponding second prongs between a position of register with the respective openings and a position of engagement with the respective second abutments. Each of the ramps is preferably formed with a convex surface along which the corresponding second prong slides during movement between the position of register with the respective opening and the position of engagement with the respective second abutment.

The release member preferably consists of sheet metal and its abutments can constitute substantially spherical deformed (embossed) portions.

The improved friction clutch preferably further comprises detent means for holding the release member in that angular position in which the prongs of the diaphragm spring engage with the respective abutments. Such detent means preferably comprises at least one female detent member on the diaphragm spring and a male detent member provided on the release member and extending into the female detent member when the prongs of the diaphragm spring engage the respective abutments of the release member. The male detent member can constitute an embossed wart-like portion of the release member. As a rule, the detent means will comprise a plurality of male and female detent members, and the detent members and the abutments are preferably disposed at least substantially at the same distance from the axis of the diaphragm spring. In accordance with a presently preferred embodiment of the invention, the detent means comprises a discrete male and a discrete female detent member for each second prong. Also, a presently preferred embodiment of the improved friction clutch employs a diaphragm spring which has three equidistant second prongs.

The radially innermost portion of each opening in the marginal portion of the release member preferably extends substantially circumferentially of the release member, and the aforementioned ramps are radially outwardly adjacent to such radially innermost portions of the corresponding openings. As mentioned above, the ramps slope in a direction to facilitate angular movement of the corresponding second prongs between positions of register with the respective openings and positions of engagement with the respective second abutments. The marginal portion of the release member is preferably further provided with substantially radially inwardly extending slots, one for each ramp, so that each ramp of the release member is disposed between one of the slots and the respective opening. In such release member, the ramps and the corresponding second abutments together preferably constitute substantially L-shaped sections of the release member. This contributes to flexibility of those portions of the release member which carry the second abutments.

The diaphragm spring can be further provided with third prongs which alternate with certain first prongs. The angular positions of the male detent members with reference to the openings of the release member are preferably such that, when the second prongs register with the respective openings, each of the male detent members engages one of the third prongs on the diaphragm spring. The angular positions of the second abutments with reference to the openings are selected in such a way that the male detent members automatically enter the respective female detent members in response to angular movement of the release member from a position in which the second prongs register with the respective openings to a position in which the second prongs engage the respective abutments. The release member is preferably arranged to bias the third prongs axially and and away from the second prongs by way of the male detent members during angular movement from a position in which the second prongs register with the respective openings to a position in which the second prongs engage the respective second abutments. The male detent members permit the second and third prongs to move axially toward each other and to thereby clamp the release member between them in response to penetration of the male detent members into the respective female detent members. The diaphragm spring preferably comprises a discrete third prong for each male detent member, and the number of male detent members preferably matches the number of second prongs.

The prongs of the diaphragm spring are elastic, as considered in the axial direction of the release member, and the elasticity of the second prongs preferably exceeds the elasticity of the first prongs. Also, the elasticity of the third prongs preferably exceeds the elasticity of the first prongs. The elasticity of the second prongs with reference to the elasticity of the first prongs can be increased by making at least a predetermined portion of each second prong narrower than the first prong, as considered in the circumferential direction of the diaphragm spring. Such second prongs preferably include first additional portions which engage with the second abutments and second additional portions which are integral with the second portion of the diaphragm spring. The predetermined portions of the second prongs are then disposed between the first and second additional portions. If desired, the elasticity of the second prongs can be increased beyond the elasticity of the first prongs by reducing the thickness of the second prongs so that such thickness is less than the thickness of the first prongs, as considered in the axial direction of the diaphragm spring.

A further feature of the invention resides in the provision of a friction clutch for use in a motor vehicle having an engine with a rotary crankshaft. The friction clutch comprises a substantially disc-shaped carrier on the crankshaft (such carrier can constitute one element of the aforementioned housing); an axially movable pressure plate; a diaphragm spring which is disposed between the pressure plate and the carrier and has a radially outermost portion reacting against the carrier, a second portion which is inwardly adjacent to the outermost portion and bears against the pressure plate, and first and second prongs which extend substantially radially inwardly from the second portion; and an axially movable release member the outer marginal portion of which is disposed between the inner end portions of the first and second prongs. Such friction clutch further comprises a counterpressure member (which can form part of the aforementioned support of housing), means for spacedly securing the counterpressure member to the carrier, and a clutch plate which is disposed between the pressure plate and the counterpressure member.

The marginal portion of the release member and the second prongs of the diaphragm spring include means for releasably coupling the release member to the diaphragm spring in such a way that the coupling is disengaged in response to angular movement of the release member with reference to the diaphragm spring through a predetermined angle or vice versa. Leaf springs or other suitable means can be provided for axially movably but non-rotatably connecting the pressure plate to the carrier.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is an enlarged view of the detail within the phantom-line circle Z in FIG. 2.

DESCRIPTION OF THE PREFERRED EMBODIMENTS

Figure 1:
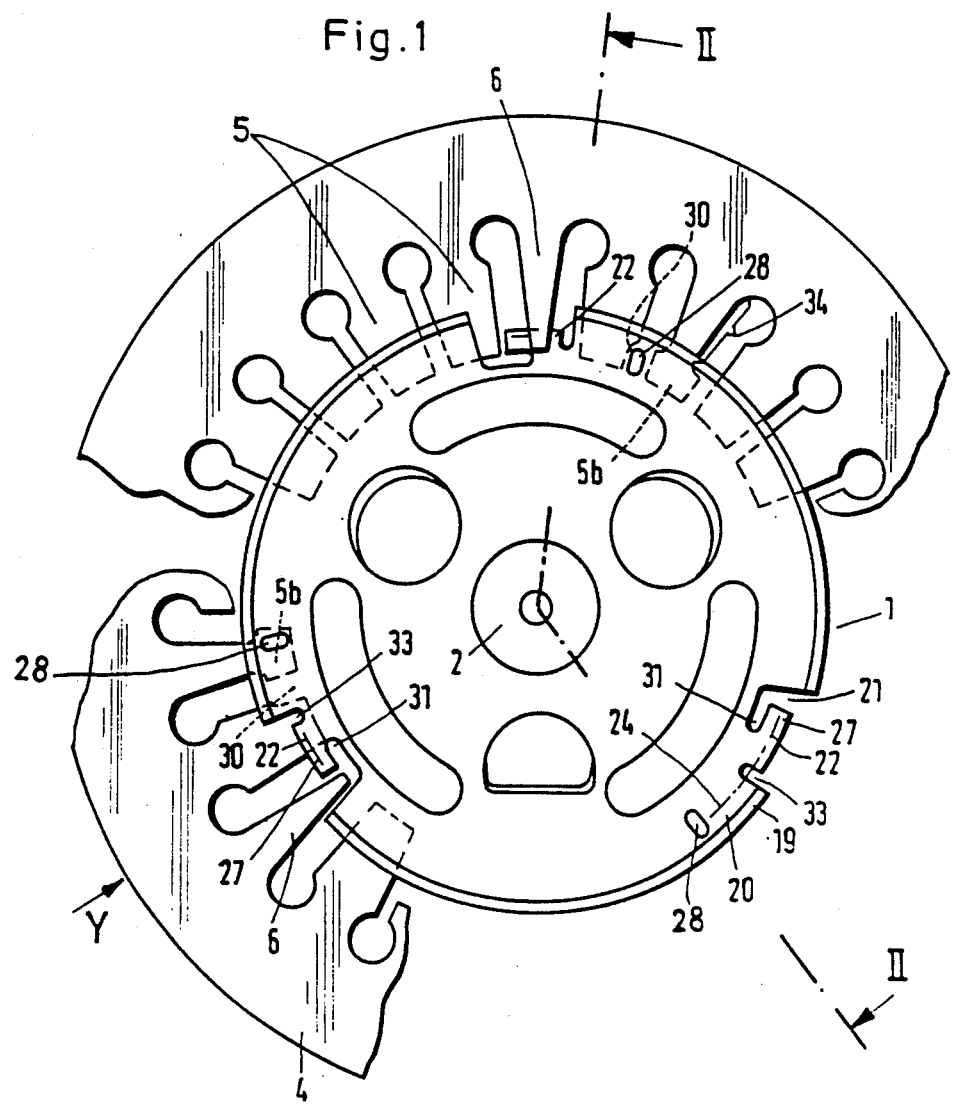
FIG. 1 is a fragmentary elevational view of a friction clutch which embodies one form of the invention as seen in the direction of arrow X in FIG. 2, the upper portion of FIG. 1 showing the release member in engagement with the prongs of the diaphragm spring and the lower left-hand portion of FIG. 1 showing these parts in angular positions they assume when the release member is detachable from the prongs of the diaphragm spring.
Figure 2:
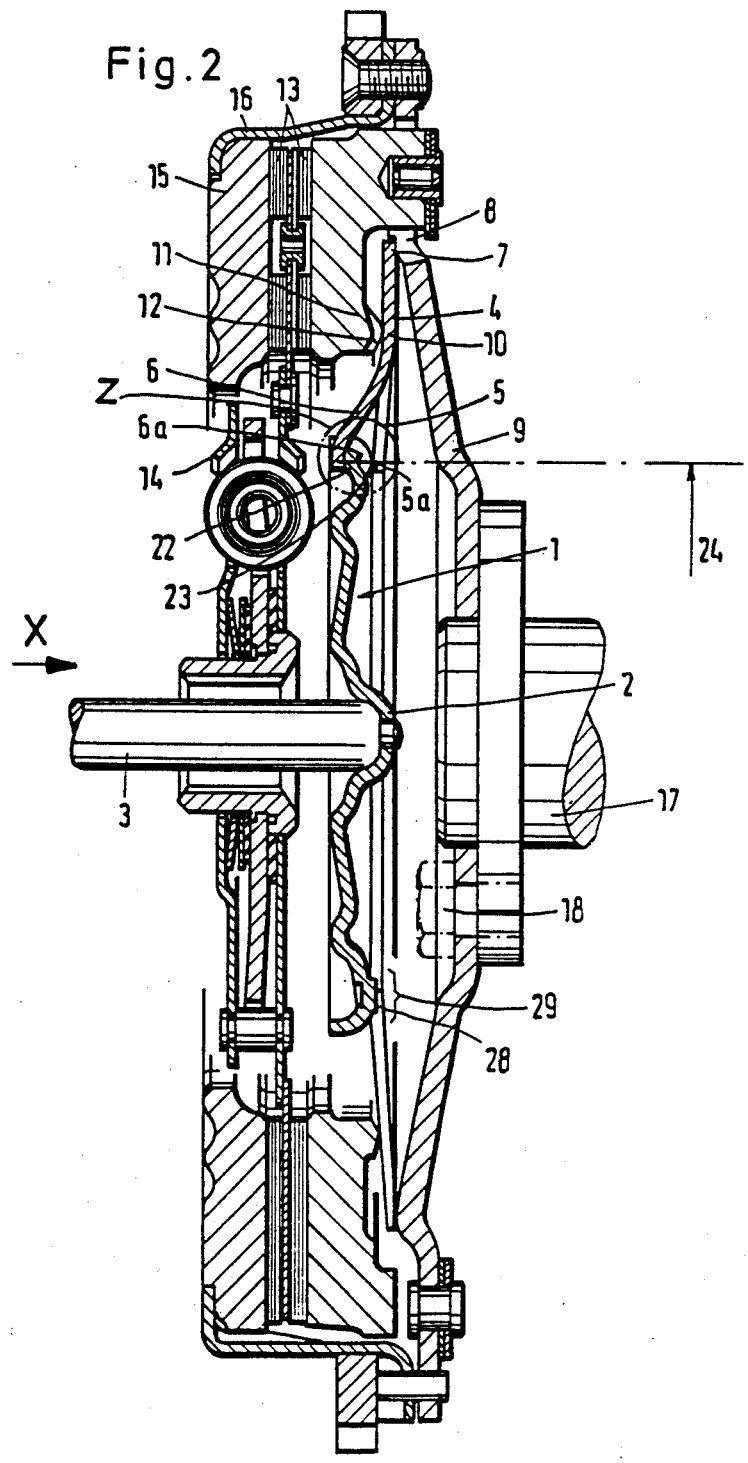
FIG. 2 is a sectional view substantially as seen in the direction of arrows from the line II—II of FIG. 1, with the release member attached to the prongs of the diaphragm spring.

The friction clutch which is shown in FIGS. 1 and 2 comprises a housing or support H and a pressure plate 11 which is installed in the interior of the housing H and is axially movably but non-rotatably secured to the latter by several leaf springs 111. The housing H comprises a counterpressure plate 15 and a combined distancing and coupling element 16 which connects the counterpressure plate 15 with a substantially disc-shaped carrier 9 of the housing. The clutch further comprises a clutch disc or plate 14 with two friction linings 13 between the counterpressure plate 15 and the pressure plate 11, a diaphragm spring 4 which is installed between the carrier 9 and the pressure plate 11, a substantially plate- or disc-shaped release member 1 which is separably coupled to the diaphragm spring 4, an actuating rod 3, which is movable in and counter to the direction indicated by the arrow X and is in engagement with a cupped central portion 2 of the release member 1, and a flange 117 which is provided on the crankshaft 17 of the engine in a motor vehicle and is secured to the central portion of the carrier 9 by bolts, screws 18 or analogous fastener means.

The release member 1 preferably constitutes a plate made of sheet metal and having a constant thickness. This plate is suitably deformed so as to be provided with the aforementioned cupped central portion 2 for the tip of the actuating rod 3 as well as with additional portions in the form of abutments 22 and 23 which are respectively provided at the second side 1B and at the first side 1A of the release member. The second side 1B faces counter to the direction of movement of the rod 3 (arrow X) which is necessary to disengage the clutch, and the first side 1A faces in such direction.

The release member 1 is separably coupled to the radially innermost portion of the diaphragm spring 4 in that its marginal portion 19 is disposed between a set of first elastic prongs 5 and a set of second elastic prongs 6 which extend radially inwardly from two circumferentially complete marginal portions 7 and 10 of the diaphragm spring. In the illustrated diaphragm spring 4, the number of first prongs 5 greatly exceeds the number (three) of second prongs 6. The prongs 6 are equidistant from each other, as considered in the circumferential direction of the diaphragm spring 4, and extend to one side of the general plane of the two circumferentially complete outer marginal portions 7 and 10 of the diaphragm spring. The prongs 6 are axially offset relative to the prongs 5. This can be readily seen in the upper portion of FIG. 2.

The radially outermost portion 7 of the diaphragm spring 4 reacts against the adjacent annular portion 8 of the carrier 9. The other circumferentially complete portion 10 of the diaphragm spring 4 is located radially inwardly of the portion 7 and bears against the lobes 12 of the pressure plate 11 when the friction clutch is engaged. This causes the pressure plate 11 to bear against the adjacent friction lining 13 and urges the other friction lining 13 against the counterpressure plate 15 which rotates with the crankshaft 17 because it is connected thereto by the flange 117, fasteners 18, carrier 9 and distancing element 16. The hub 114 of the clutch disc 14 then transmits torque to the input shaft of a change-speed transmission (not shown) in the motor vehicle in which the improved friction clutch is installed. In order to disengage the clutch, the actuating rod 3 is moved in the direction of arrow X so as to cause the release member 1 to depress the radially innermost portions 5a of the prongs 5 by way of the abutments 23 whereby the diaphragm spring pivots in the region of its radially outermost portion 7 and moves its portion 10 in a direction to the right, as viewed in FIG. 2, in order to relax the bias upon the pressure plate 11 which, in turn, relaxes the pressure against the adjacent friction lining 13 so that the housing H can rotate relative to the clutch disc 14 and vice versa. The diaphragm spring 4 is installed in prestressed condition so that its portion 10 normally bears against the lobes 12 of the pressure plate 11, i.e., the diaphragm spring reengages the clutch as soon as the rod 3 is retracted in a direction to the left, as viewed in FIG. 2, or the prongs 5 of the diaphragm spring 4 are free to push the entire release member 1 counter to the direction which is indicated by the arrow X. The means for non-rotatably securing the radially outermost portion of the combined distancing and coupling element 16 to the radially outermost portion of the carrier 9 is shown at 116.

Figure 3:
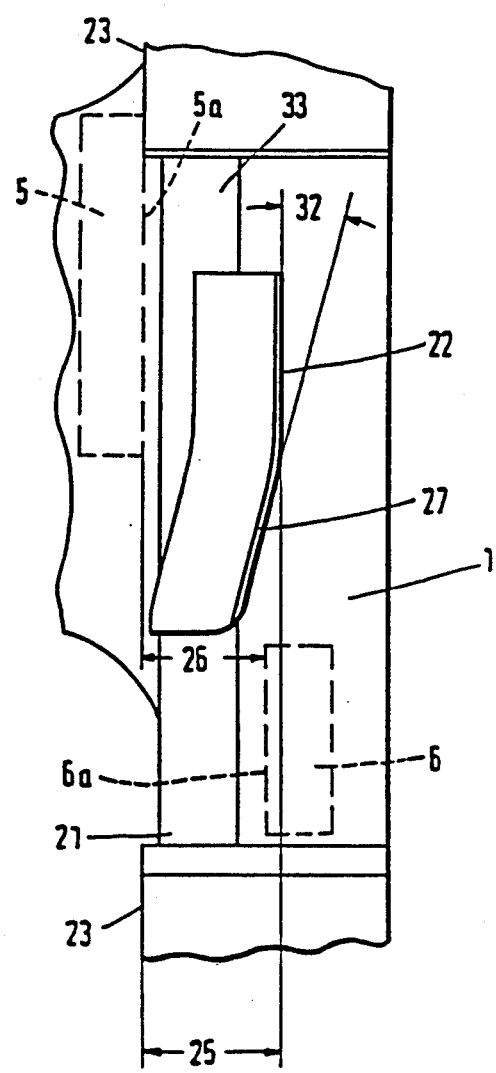
FIG. 3 is a greatly enlarged view of a detail of the release member, substantially as seen in the direction of arrow Y in FIG. 1.

As can be readily seen in FIGS. 1 and 3, the marginal portion 19 of the release member 1 is formed with radially inwardly extending openings 21 in the form of radially inwardly tapering slots which also extend into the adjacent portion or region 20 of the release member. One such opening 21 is provided for each second prong 6 of the diaphragm spring 4. The openings 21 are dimensioned in such a way that each thereof can permit passage of a second prong 6, as considered in the axial direction of the diaphragm spring 4. The second side 1B of the release member 1 is further provided with the aforementioned equidistant abutments 22 each of which can constitute a round protuberance (see FIG. 4) which is obtained by embossing the corresponding portion of the release member and each of which has a convex (preferably hemispherical) exposed surface (22a) for engagement with the corresponding second prong 6, namely with the radially innermost portion 6a of such prong, when the release member 1 is properly coupled to the diaphragm spring 4. The first side 1A of the release member 1 is formed with the aforementioned abutments or protuberances 23 preferably having convex (most preferably hemispherical) exposed surfaces 23a (see FIG. 4) for engagement with the radially innermost portions 5a of the first prongs 5. The reference character 24 denotes a circle on which the abutments 22 and 23 at the opposite sides 1B and 1A of the release member 1 are located. The openings 21 extend radially outwardly as well as radially inwardly beyond the circle 24. The convex or spherical configuration of exposed surfaces of the abutments 22 and 23 considerably reduces the friction which must be overcome when the release member 1 must be turned relative to the diaphragm spring 4 in order to move the second prongs 6 into positions of register with the respective openings 21 or into positions of engagement with the respective abutments 22. Such configuration of the abutments 22, 23 considerably reduces the extent of wear to which the parts 1 and 4 of the improved friction clutch are subjected, not only during attachment or separation of the release member 1 but also when the friction clutch is in actual use. It will be noted that the abutments 22 and 23 extend in the opposite directions, as considered axially of the friction clutch.

Figure 3A:
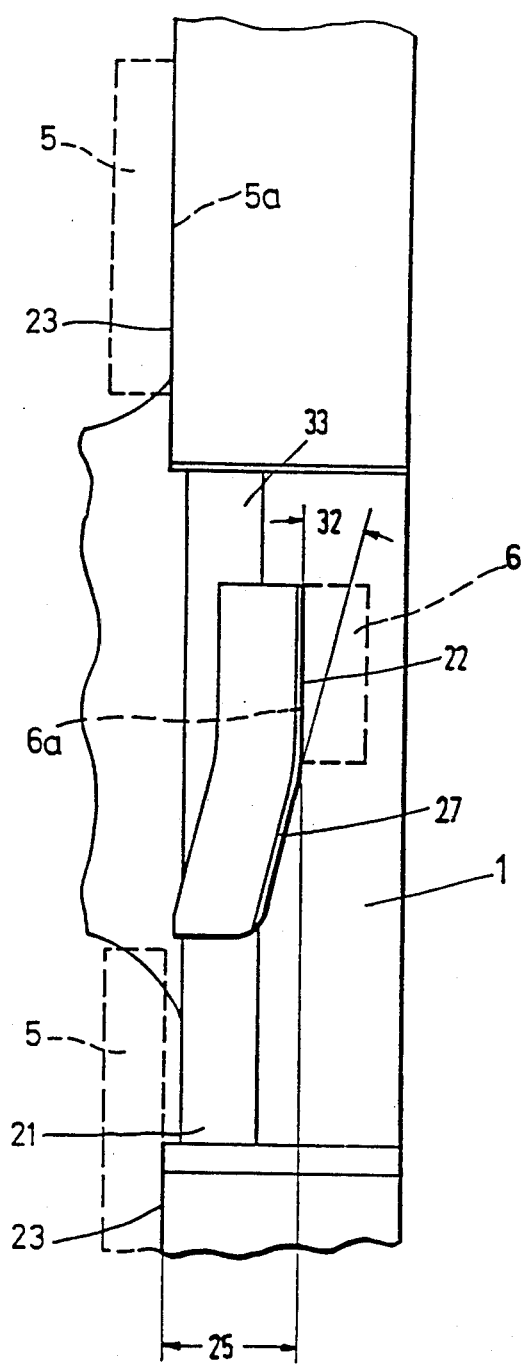
FIG. 3a illustrates the structure of FIG. 3 but with the release member in a different angular position.

In order to enhance the retaining action of the prongs 5 and 6 upon the marginal portion 19 of the release member 1, the normal axial distance 26 (see FIG. 3) between the common plane of the tips of the abutments 22 and the common plane of the tips of the abutments 23 is slightly less than the distance 25 (FIG. 3) between such planes when the release member 1 is properly engaged with the diaphragm spring 4 in that the portions 6a of the second prongs 6 engage the corresponding abutments 22 at the second side 1B of the release member. In other words, when the release member 1 is rotated from a position (see FIG. 3) in which its openings 21 register with the respective second prongs 6 to a position (see FIG. 3a) in which the second prongs 6 engage the corresponding abutments 22, the axial distance between the prongs 5 on the one hand and the prongs 6 on the other hand increases to an extent which equals the difference between the distances 25 and 26 in FIG. 3 so that the prongs 5 and 6 are stressed and bear against the respective sides of the release member. FIG. 3 shows the position of one second prong 6 by broken lines. The prong 6 assumes such position prior to turning of the release member 1 from a position in which such prong is in register with the corresponding opening 21 to the position (FIG. 3a) in which the prong 6 engages the convex or spherical exposed surface 22a (FIG. 4) of the corresponding abutment 22. It has been found that the release member 1 can be properly held if the difference between the distances 25 and 26 is in the range of between 0.1 and 1 mm.

In order to facilitate the assembly of the release member 1 with the diaphragm spring 4, the second side 1B of the release member is preferably further provided with elongated ramps 27 each of which slopes in a direction from the respective opening 21 toward the corresponding abutment 22 so as to facilitate gradual flexing of a prong 6 while such prong slides along the preferably convex exposed surface of the respective ramp 27 or vice versa. The angle of inclination of one of the ramps 27 is shown in FIG. 3, as at 32. The angle 32 can be a relatively small acute angle. The ramps 27 contribute significantly to the ease of axial spreading of the first and second prongs 5 and 6 away from each other in response to angular displacement of the release member 1 in a direction to move the openings 21 out of register with the respective second prongs 6 and to move the exposed surfaces of the abutments 22 into engagement with the radially innermost portions 6a of the corresponding second prongs.

The improved friction clutch is further provided with detent means which serves to prevent accidental disengagement of the abutments 22, 23 from the respective prongs 6, 5 when the clutch is fully assembled and is in actual use. Such accidental separation of the release member 1 could take place as a result of vibration of the friction clutch when the motor vehicle in which the clutch is installed is in motion. The detent means which serves the just mentioned purpose preferably further serves as a means for centering the release member 1 with reference to the diaphragm spring 4 when the parts 1 and 4 are properly coupled to each other. The detent means comprises male detent members in the form of substantially wart-shaped protuberances 28 which are provided on the release member 1 and extend axially from its first side 1A. When the release member 1 is properly coupled to the diaphragm spring 4, each of the male detent members or protuberances 28 extends into a complementary female detent member 30 which is a slot provided between pairs of neighboring prongs 5 on the diaphragm spring 4. The male detent members 28 are preferably disposed at the same distance from the axis of the diaphragm spring 4 as the abutments 22, 23. That region (as considered radially of the release member 1) in which the abutments 22, 23 are located at the opposite sides of the release member is shown in FIG. 2, as at 29. It will be noted that the radial dimensions of the male detent members 28 can equal or approximate the width of the region 29.

In the illustrated embodiment, the number (three) of second prongs 6 matches the number of male detent members 28 and the number of female detent members 30.

In order to facilitate the making of the release member 1 as a piece of sheet metal, the radially extending openings 21 are preferably provided with radially innermost portions 31 which extend in the circumferential direction of the release member (see particularly FIG. 1) so that each ramp 27 and the adjacent abutment 22 of the release member 1 together constitute a substantially L-shaped section or portion of the release member, and such section is disposed slightly radially inwardly of the circumference of the major part of the release member 1. It will be noted that each of the ramps 27 is disposed radially outwardly of the innermost portion 31 of the respective radial opening 21 in the marginal portion 19 of the release member 1. Such configuration of the sections including the ramps 27 and the adjacent abutments 22 facilitates the bending of the ramps 27 in a manner as shown in FIG. 3 so that the surfaces of the ramps 27 which serve as guides or tracks for the inner end portions 6a of the respective second prongs 6 make with the general plane of the release member the aforementioned acute angles 32.

The deformation of the ramps 27 in a manner as shown in FIG. 3 is facilitated still further if the marginal portion 19 of the release member 1 is formed with three radially extending slots or notches 33. As can be seen in FIG. 1, each of the ramps 27 is disposed between a notch or slot 33 and the respective radially inwardly extending opening 21. Each notch or slot 33 is disposed at that side of the respective abutment 22 which faces away from the corresponding ramp 27 and opening 21. The notches or slots 33 are sufficiently deep to extend radially inwardly and outwardly beyond the aforementioned circle 24.

As can be best seen in FIG. 1, the angular distribution of male detent members 28, of radially extending openings 21, of abutments 22 and of female detent members 30, as considered in the circumferential direction of the diaphragm spring 4 or release member 1, is such that when the second prongs 6 are caused to pass axially through the corresponding openings 21, the male detent members 28 abut against third elastic prongs 5b of the diaphragm spring 4. This can be seen in the lower left-hand portion of FIG. 1 which shows the angular position of the release member 1 relative to the diaphragm spring 4 at the time when each second prong 6 is in register with the corresponding opening 21. When the angular displacement of the release member 1 relative to diaphragm spring 4 (and/or vice versa) is completed so that the inner end portions 6a of the second prongs 6 engage the corresponding abutments 22, the male detent members 28 automatically snap into the corresponding female detent members 30 to hold the release member 1 against undesirable angular movement with reference to the diaphragm spring 4. Such positions of the detent members 28 and of the inner end portions 6a of the second prongs 6 are shown in the upper portion of FIG. 1.

When the release member 1 is rotated in a direction to move the inner end portions 6a of the second prongs 6 into engagement with the corresponding abutments 22, the detent members 28 slide along the corresponding third prongs 5b and cause an axial separation of the prongs 5b and 6, i.e., the axial distance between the tips of the prongs 5b and 6 increases. All of the prongs 5, 6 and 5b are elastic, at least to a certain extent. Therefore, when the movement of the end portions 6a of the prongs 6 into engagement with the corresponding abutments 22 is completed, the axially stressed prongs 5 and 5b move toward the respective side 1A of the release member 1 which causes the detent members 28 to snap into the adjacent female detent members 30 and to thus establish a reliable connection between the parts 1 and 4. The inner end portion 6a of the second prongs 6 are moved axially of the clutch and away from the prongs 5 and 5b (while the release member 1 rotates in a direction to move the second prongs 6 from positions of register with the openings 21 into engagement with the corresponding abutments 22) by the ramps 27 so that such ramps also contribute to axial stressing of the prongs 6 and hence also of the prongs 5 and 5b. The axial distance between the prongs 6 on the one hand and the prongs 5 and 5b on the other hand is reduced as soon as the male detent members 28 snap into the corresponding female detent members 30. The detent members 28 not only hold the release member 1 against undesirable angular movements relative to the diaphragm spring 4 but they also accurately center the release member 1 in the friction clutch. The prongs 5, 5b and 6 remain axially stressed when the movement of the release member 1 to the angular position shown in the upper portion of FIG. 1 is completed, i.e., even after the male detent members 28 are free to snap into the corresponding female detent members 30.

In order to reduce the effort which is necessary to turn the release member 1 relative to the diaphragm spring 4 or vice versa, it is advisable to properly select the elasticity or resiliency of the prongs, as considered in the axial direction of the diaphragm spring. It is preferred to construct and/or dimension the second prongs 6 in such a way that their elasticity, as considered in the axial direction of the diaphragm spring 4, exceeds the elasticity of the first prongs 5. For this purpose, the width of the second prongs 6, as considered in the circumferential direction of the diaphragm spring 4, is preferably less than the width of the first prongs 5.

Furthermore, it is desirable to make the third prongs 5b more elastic than the prongs 5 and/or prongs 6. As can be seen in the upper portion of FIG. 1, the median portion 34 of each third prong 5b is narrower than the adjacent prongs 5, as considered in the circumferential direction of the diaphragm spring 4. Such median portions 34 are disposed between the radially innermost portions (which engage with the male detent members 28 during assembly of the release member 1 with the diaphragm spring 4) and the radially outermost portions (namely those portions which are integral with the circumferentially complete portion 10 of the diaphragm spring) of the third prongs 5b. The pronounced or highly pronounced elasticity of the third prongs 5b reduces the magnitude of the effort which is required to flex the prongs 5b by the corrsponding male detent members 28 during movement of the release member 1 from the angular position in which the second prongs 6 are in register with the corresponding openings 21 to the position in which the second prongs 6 engage the respective abutments 22. If desired, the elasticity of the prongs 6 and/or 5b with reference to the elasticity of the first prongs 5 can be reduced by reducing the thicknesses of the prongs 6 and/or 5b, as considered in the axial direction of the diaphragm spring 4. Furthermore, combinations of the aforementioned undertakings are possible in order to ensure that the difference between the elasticities of the prongs 5 and 6 as well as between the elasticities of the prongs 5b and 5 will be sufficiently pronounced.

An important advantage of the improved release member 1, of the improved diaphragm spring 4 and of their connection is that they contribute very little to the axial dimensions of the friction clutch. Furthermore, the assembly of the release member 1 with the diaphragm spring 4 and its disengagement from the diaphragm spring are relatively simple operations which take up little time.

Another important advantage of the parts 1 and 4 and their connection is that, when the friction clutch is in actual use, the extent of relative movement between the inner end portions 5a and 6a of the prongs 5 and 6 on the one hand and the adjacent abutments 23 and 22 of the release member on the other hand is minimal so that the clutch can stand extensive periods of use without excessive wear upon the release member and/or diaphragm spring. The inner end portions 5a and 6a of the prongs 5 and 6 actually roll (rather than slide) relative to the corresponding abutments 23 and 22 which contributes significantly to a reduction of wear and hence to longer useful life of the release member 1, of the diaphragm spring 4 and of the entire friction clutch. The placing of abutments 22 at the same radial distance from the axis of the diaphragm spring 4 as the abutments 23, as well as the provision of convex or spherical external surfaces on such abutments, also contributes to a reduction of wear upon the parts 1 and 4.

A further important advantage of the improved friction clutch is that the assembly of the release member 1 with the prongs 5 and 6 of the diaphragm spring 4 is surprisingly simple and requires the exertion of a relatively small effort. Furthermore, such assembly can be carried out without resorting to specially designed tools. All that is necessary is to introduce the prongs 6 into the corresponding openings 21 of the release member 1 so that the end portions 6a of the prongs 6 are adjacent to the second side 1B of the release member, and to thereupon turn the release member so that the end portions 6a slide along the suitably inclined ramps 27 toward engagement with the convex or spherical exposed surfaces of the corresponding abutments 22. The difference between the aforediscussed distances 25 and 26 suffices to ensure that the end portions 5a and 6a of the prongs 5 and 6 remain in requisite engagement with the corresponding abutments 23 and 22.

The magnitude of the force which is required to turn the release member 1 relative to the diaphragm spring 4 depends upon the extent to which the abutments 23 and 22 project beyond the respective sides 1A and 1B of the release member 1 as well as on the length and the inclination of the ramps 27. It has been found that the inclination of the ramps 27 is quite satisfactory if the angle 32 (see FIG. 3) is between 10 and 35 degrees, preferably approximately or exactly 15 degrees.

As mentioned above, the release member 1 can be made as a simple stamping from a sheet or plate consisting of metallic material. This also contributes to the simplicity and reasonable cost of the release member 1 as well as of the entire friction clutch. The abutments 22, 23 and the male detent members 28 can constitute simple embossed projections of the release member 1.

While it is also possible to employ other types of detent means, the illustrated detent means 28, 30 are preferred at this time because of their simplicity, compactness and low manufacturing cost. Furthermore, and as mentioned above, the detent means 28, 30 can perform the additional function of accurately centering the release member 1 relative to the diaphragm spring 4 when the prongs 6 of the diaphragm spring properly engage the corresponding abutments 22. In addition, while it is possible to reduce the number of prongs 6 and detent members 28 to less than three or to increase the number of prongs 6 and detent members 28 beyond three, it has been found that the illustrated number is normally sufficient to ensure adequate centering of the release member 1 as well as proper retention of such release member in its normal operative angular position.

The provision of the circumferentially extending radially innermost portions 31 of the openings 21 in the marginal portions 19 of the release member 1 contributes significantly to the simplicity of the making of ramps 27. Thus, it is not necessary to gradually increase the thickness of the ramps 27 in order to ensure the establishment of a slope which results in gradual flexing of second prongs 6 during movement from a position of register with the respective openings 21 toward engagement with the exposed surfaces of the respective abutments 22. Instead, and due to the provision of the radially innermost portions 31, it is possible to simply bend the ramps 27 in a manner as best shown in FIG. 3 and to thereby provide the required inclination (angle 32) for smooth and gradual flexing of the prongs 5 and 6 during the aforementioned angular displacement of the release member 1 between its two end positions. The provision of radially extending notches or slots 33 adjacent to those sides of the abutments 22 which face away from the respective ramps 27 also contributes to the ease of properly shaping the ramps 27 so that the angles 32 will be within the aforementioned ranges.

As mentioned above, the axial distance between the prongs 5 and 6 is slightly reduced when the male detent members 28 are permitted to snap into the corresponding female detent members 30. However, the remaining axial stressing of the prongs 5 and 6 suffices to ensure that such parts of the diaphragm spring 4 continue to contribute to proper retention of the release member 1 in accurately centered position when the end portions 6a of the prongs 6 engage the corresponding abutments 22 at the second side 1B of the release member. It will be noted that the axial distance between the set of prongs 5 and the set of prongs 6 increases gradually during angular movement of the release member 1 with reference to the diaphragm spring 4 in a direction to move the end portions 6a of the prongs 6 into engagement with the corresponding abutments 22, and that such distance is slightly reduced when the angular movement of the release member in the just-mentioned direction is completed. The residual axial stressing of the prongs 5 and 6 suffices to ensure that such prongs also contribute to proper retention of the release member 1 in desired angular position. The elasticity of the prongs 5, 6 and/or 5b can be readily selected in such a way that the angular movements of the release member 1 relative to the diaphragm spring 4 and/or vice versa require the exertion of an effort which is selected by the manufacturer of the friction clutch.

It has been found that the improved diaphragm spring 4 and the improved release member 1 can be used with particular advantage in friction clutches of the type shown in FIGS. 1 and 2, namely in clutches wherein the radially outermost portion 7 of the diaphragm spring bears against a portion of the housing H and a second circumferentially complete annular portion 10 of the diaphragm spring bears against the adjacent portions 12 of the pressure plate 11. The pressure plate 11 is movable axially in the housing H including the parts 9, 15 and 16 but is held against rotation relative to the housing H by the leaf springs 111.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for use in motor vehicles, comprising a support including a housing; an axially movable pressure plate in said housing; a diaphragm spring disposed in said housing between said support and said plate and having a first portion reacting against said support, a second portion bearing against said plate, first prongs extending at least substantially radially inwardly from said portions and second prongs alternating with at least some of said first prongs, as considered in the circumferential direction of said spring, said first and second prongs being axially offset relative to each other and having radially innermost portions, the number of said first prongs exceeding the number of said second prongs; a substantially plate-like axially movable release member having a first side and a second side, a marginal portion provided with an opening for each of said second prongs, first substantially coplanar abutments provided at said first side and engaging the innermost portions of said first prongs, and second substantially coplanar abutments provided at said second side and each engaging the innermost portion of a discrete second prong, the distance between the axis of said spring and the first abutments at least approximating the distance between such axis and said second abutments, at least some of said abutments having convex surfaces in contact with the respective prongs, said release member being movable angularly relative to said spring to place said second prongs into register with the respective openings and being arranged to maintain said first and second prongs in axially stressed condition so that the axial distance between the planes of said first and second prongs when said prongs engage the respective abutments exceeds the axial distance between said planes when said second prongs register with and are free to enter the respective openings; and actuating means for moving said release member axially in a direction to pivot said spring in the region of one of said first and second portions and to thereby relax the bias of said spring upon said pressure plate, said first side of said release member facing in and said second side of said release member facing counter to said direction.

2. The clutch of claim 1, wherein the second side of said release member has a ramp adjacent to each of said openings and sloping toward the respective second abutment to facilitate angular movement of the corresponding second prong between a position of register with the respective opening and a position of engagement with the respective second abutment.

3. The clutch of claim 2, wherein each of said ramps has a convex surface along which the corresponding second prong slides during movement between the position of register with the respective opening and the position of engagement with the respective second abutment.

4. The clutch of claim 1, wherein said release member consists of sheet metal and said abutments constitute substantially spherical convex deformed portions of the release member.

5. The clutch of claim 1, further comprising detent means for holding said release member in that angular position in which said prongs engage with the respective abutments.

6. The clutch of claim 5, wherein said detent means comprises at least one female detent member on said spring and a male detent member provided on said release member and extending into said female detent member.

7. The clutch of claim 6, wherein said male detent member constitutes an embossed wart-like portion of said release member.

8. The clutch of claim 6, wherein said detent means comprises a plurality of male and female detent members, said detent members and said abutments being disposed at least substantially at the same distance from the axis of said spring.

9. The clutch of claim 6, wherein said detent means comprises a discrete male and a discrete female detent member for each of said second prongs.

10. The clutch of claim 9, wherein said spring has three equidistant second prongs.

11. The clutch of claim 1, wherein each of said openings has a radially innermost portion extending substantially circumferentially of said release member and said second side of said release member has ramps each of which is radially outwardly adjacent to a different one of said radially innermost portions and slopes in a direction to facilitate angular movement of the corresponding second prong between a position of register with the respective opening and a position of engagement with the respective second abutment.

12. The clutch of claim 1, wherein said second side of said release member has a plurality of ramps, one for each of said second prongs and each extending between the respective opening and the corresponding second abutment to facilitate angular movement of the corresponding second prong between a position of registry with the respective opening and a position of engagement with the respective second abutment, said marginal portion further having a slot for each of said ramps so that each ramp is disposed between one of said slots and the respective opening.

13. The clutch of claim 12, wherein said ramps and the corresponding second abutments together constitute substantially L-shaped sections of said release member, said openings having radially innermost portions extending in the circumferential direction of the release member and said ramps being disposed radially outwardly of the respective radially innermost portions.

14. The clutch of claim 1, wherein said spring further comprises third prongs and further comprising detent means for yieldably holding said release member in an angular position in which said second prongs engage the respective second abutments, said detent means comprising female detent members provided on said spring and male detent members provided on said release member and extending into the respective female detent members when said second prongs engage the corresponding second abutments, the angular positions of said male detent members with reference to said openings being such that, when said second prongs register with the respective openings, each of said male detent members engages one of said third prongs.

15. The clutch of claim 14, wherein the angular positions of said second abutments with reference to said openings are such that said male detent members automatically enter the respective female detent members in response to angular movement of said release member from a position in which said second prongs register with the respective openings to a position in which said second prongs engage the respective abutments.

16. The clutch of claim 15, wherein said release member is arranged to bias said third prongs axially and away from said second prongs by way of said male detent members during angular movement from a position in which said second prongs register with the respective openings to a position in which said second prongs engage the respective second abutments, said male detent members permitting said second and third prongs to move axially toward each other and to clamp the release member therebetween in response to penetration of said male detent members into the respective female detent members.

17. The clutch of claim 16, wherein said spring comprises a discrete third prong for each of said male detent members and the number of said male detent members matches the number of said second prongs.

18. The clutch of claim 16, wherein said prongs are elastic, as considered in the axial direction of said release member, and the elasticity of said third prongs exceeds the elasticity of said first prongs.

19. The clutch of claim 1, wherein said prongs are elastic, as considered in the axial direction of said release member, and the elasticity of said second prongs exceeds the elasticity of said first prongs.

20. The clutch of claim 1, wherein the width of at least a predetermined portion of each of said second prongs is less than the width of said first prongs, as considered in the circumferential direction of said spring.

21. The clutch of claim 20, wherein said second prongs include first additional portions which engage with said second abutments and second additional portions which are integral with one of said first and second portions of said spring, said predetermined portions being disposed between the first and second additional portions of the respective second prongs.

22. The clutch of claim 1, wherein said prongs are elastic, as considered in the axial direction of said spring, and the elasticity of said second prongs exceeds the elasticity of said first prongs, the thickness of each of said first prongs exceeding the thickness of each of said second prongs, as considered in the axial direction of said spring.

23. A friction clutch as defined in claim 1 for use in a motor vehicle having an engine with a rotary crankshaft, wherein said housing comprises a substantially disc-shaped carrier on the crankshaft and said diaphragm spring is disposed between said pressure plate and said carrier, said first portion constituting the radially outermost portion of said diaphragm spring and reacting against said carrier, said second portion of said diaphragm spring being inwardly adjacent to said outermost portion and bearing against said pressure plate, and further comprising a counterpressure member, means for spacedly securing said counterpressure member to said carrier, and a clutch plate disposed between said pressure plate and said counterpressure member.

24. The clutch of claim 23, further comprising means for axially movably but non-rotatably connecting said pressure plate to said carrier.

* * * * *